United States Patent [19]

Usui et al.

[11] Patent Number: 5,419,876
[45] Date of Patent: May 30, 1995

[54] DEVICE FOR THE CATALYTIC PURIFICATION OF AUTOMOTIVE EXHAUST GAS

[75] Inventors: Masayoshi Usui, Numazu; Yuuzo Hitachi, Tagata; Katsushi Washizu, Numazu, all of Japan

[73] Assignee: Usui Kokusai Sangyo Kaisha Limited, Japan

[21] Appl. No.: 938,442

[22] Filed: Aug. 31, 1992

[30] Foreign Application Priority Data

Sep. 3, 1991 [JP]  Japan ............................ 3-078797 U

[51] Int. Cl.⁶ .................... B01D 53/92; B01D 53/94
[52] U.S. Cl. ..................... 422/177; 55/DIG. 30; 422/179; 422/198; 422/206
[58] Field of Search ............... 422/177, 179, 180, 172, 422/198, 206; 55/DIG. 30, 321; 29/890, 890.08; 60/299, 301; 165/10 A

[56] References Cited

U.S. PATENT DOCUMENTS

| | | | |
|---|---|---|---|
| 3,247,666 | 4/1966 | Behrens | 422/175 X |
| 4,107,922 | 8/1978 | Wössner | 60/298 |
| 4,160,010 | 7/1979 | Ottle | 422/180 |
| 4,318,888 | 3/1982 | Chapman et al. | 29/890 |
| 4,415,118 | 11/1983 | Endo | 165/10 A |
| 4,942,019 | 7/1990 | Goodell et al. | 422/169 |
| 4,976,103 | 12/1990 | Takikawa et al. | 422/180 |
| 5,130,099 | 7/1992 | Schatz | 422/175 |

*Primary Examiner*—Robert J. Warden
*Assistant Examiner*—Krisanne M. Thornton
*Attorney, Agent, or Firm*—Anthony J. Casella; Gerald E. Hespos

[57] ABSTRACT

A device for the catalytic purification of automotive exhaust gas includes at least one inner casing housing an assembly of corrugated, or corrugated and flat, thin metal sheets carrying a catalyst thereon, and disposed between a gas inlet and a gas outlet which are adapted for connection to an exhaust pipe extending from an engine. An outer casing surrounds the inner casing in a speced apart relation therefrom, and is joined to it in a gastight way. The inner and outer casings define therebetween a closed space filled with a heat storing material which can collect and store the heat of exhaust gas.

6 Claims, 3 Drawing Sheets

DEVICE FOR THE CATALYTIC PURIFICATION OF AUTOMOTIVE EXHAUST GAS

BACKGROUND OF THE INVENTION

1. Field of the Invention

This invention relates to an improved device connected in the exhaust pipe of an automobile for the catalytic purification of exhaust gas.

2. Description of the Prior Art

There are known a variety of devices used for the catalytic purification of exhaust gas from an automobile. They have, however, the drawback of failing to purify exhaust gas satisfactorily, since the catalyst which is usually employed can work only at a temperature of at least about 400° C. The catalyst is so cold during the beginning of engine operation, particularly during the cold season of the year, as to require a considerably long time before it reaches its working temperature. As a natural consequence, the device allows a large amount of toxic gas to leave the automobile. It is estimated that about 70% of the exhaust gas which is produced during the engine operation is allowed to leave the automobile without being purified.

There is also known a precatalyzer installed close to the engine to enable the catalyst to reach its working temperature more rapidly. Even this device is, however, unsatisfactory for the effective purification of exhaust gas.

SUMMARY OF THE INVENTION

Under these circumstances, it is an object of this invention to provide an improved device which enables a catalyst to purify exhaust gas from an automobile engine effectively even during the beginning of engine operation.

This object is essentially attained by a device which comprises a generally cylindrical inner casing, an assembly of corrugated thin metal sheets, or corrugated and flat thin metal sheets, housed in the inner casing, and disposed between a gas inlet and a gas outlet which are adapted for connection to an exhaust pipe extending from an engine, the sheets carrying a catalyst thereon, and a generally cylindrical outer casing surrounding the inner casing in a spaced apart relation therefrom, and joined to it in a gastight way, the inner and outer casings defining therebetween a closed space filled with a heat storing material.

According to a preferred aspect of this invention, the device includes a plurality of inner casings disposed in parallel to one another, surrounded by a single outer casing, and spaced apart from one another and the outer casing by the heat storing material.

According to another preferred aspect of this invention, the device further includes a third casing surrounding the outer casing in a gastight way and defining a heat insulating space around it.

The heat storing material can store the heat of exhaust gas from the engine in operation so effectively as to hold the catalyst at an appropriately high temperature for a fairly long time after the engine operation has been discontinued, and thereby enable it to purify exhaust gas effectively from the beginning of a new engine operation. The corrugated sheets enable the catalyst to contact the exhaust gas in a large surface area and thereby purify it effectively.

DESCRIPTION OF THE PREFERRED EMBODIMENTS

Figure 1:
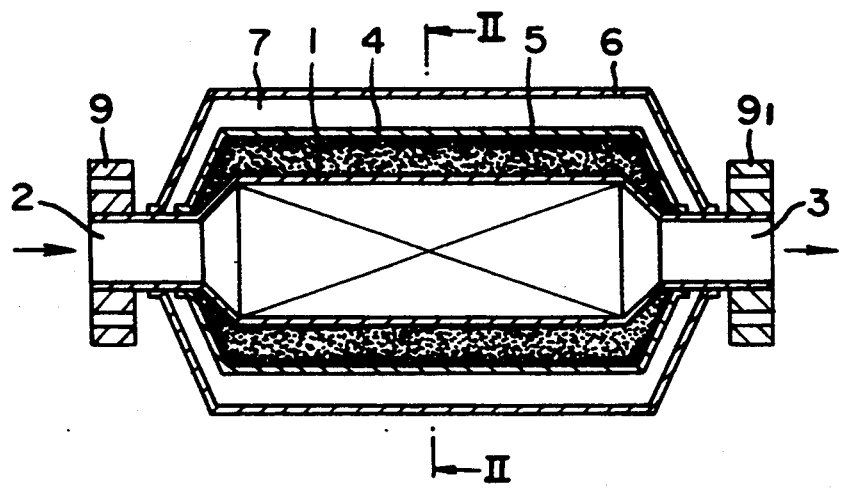
FIG. 1 is a longitudinal sectional view of a device embodying this invention.
Figure 2A:
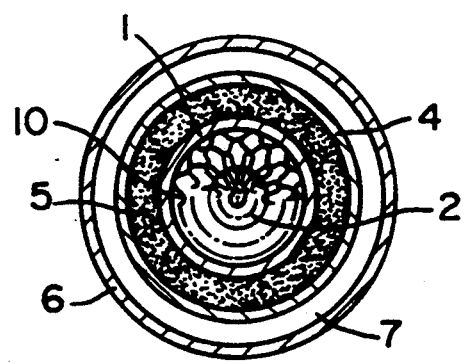
FIG. 2a is a sectional view taken along the line II—II of FIG. 1.

A device embodying this invention is shown in FIGS. 1 and 2a. It includes a generally cylindrical inner casing 1 having a gas inlet 2 and a gas outlet 3 at which the device is connected in an exhaust pipe extending from an automobile engine, but not shown, by a pair of flanges 9 and $9_1$. The casing 1 houses a spirally wound assembly of corrugated thin metal sheets 10, as shown in FIG. 2a. The sheets support a catalyst thereon, 10 and are, for example, of a heat-resisting steel containing 20% by weight of chromium and 5% by weight of aluminum, the balance of its composition being substantially iron.

A generally cylindrical outer casing 4 surrounds the inner casing 1 and is joined to it in a gastight way. The inner and outer casings 1 and 4 define therebetween a closed space filled with a heat storing material 5. The heat storing material 5 can effectively store the heat of exhaust gas flowing from the engine during its operation and thereby maintain the catalyst at an appropriately high temperature for a fairly long time even after the operation of the engine has been discontinued.

The device further includes a third generally cylindrical casing 6 surrounding the outer casing 4 in a gastight way. The casings 4 and 6 define a heat-insulating space 7 therebetween. The space 7 may or may not be an evacuated one. The space 7 enables the heat storing material 5 to store more effectively the heat which it has collected from the exhaust gas flowing in the direction of arrows.

Figure 2B:
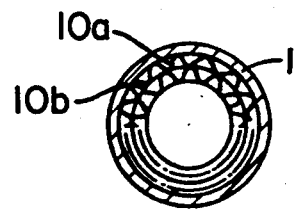
FIG. 2b is a view similar to a part of FIG. 2a, but showing a part of a modified form of device.

FIG. 2b shows a modified form of the spirally wound assembly. It consists of corrugated and flat sheets 10a and 10b respectively.

Figure 3:
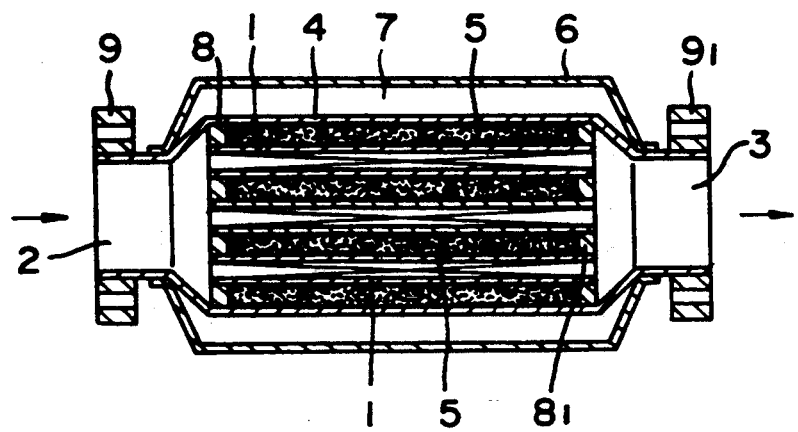
FIG. 3 is a view similar to FIG. 1, but showing another embodiment of this invention.

A different form of device embodying this invention is shown in FIG. 3. It is substantially equal to the device shown in FIG. 1, but includes a plurality of parallel inner casings 1 disposed in a single outer casing 4, and each housing a spirally wound metal sheet assembly 10c supporting a catalyst. The inner casings 1 have a common gas inlet 2 and a common gas outlet 3 which are defined at the opposite ends, respectively, of the outer casing 4. The outer casing 4 has a pair of dividing walls 8 and $8_1$ at the opposite ends, respectively, of the inner casings 1 to hold the inner casings 1 and the heat storing material 5 in position.

Figure 4:
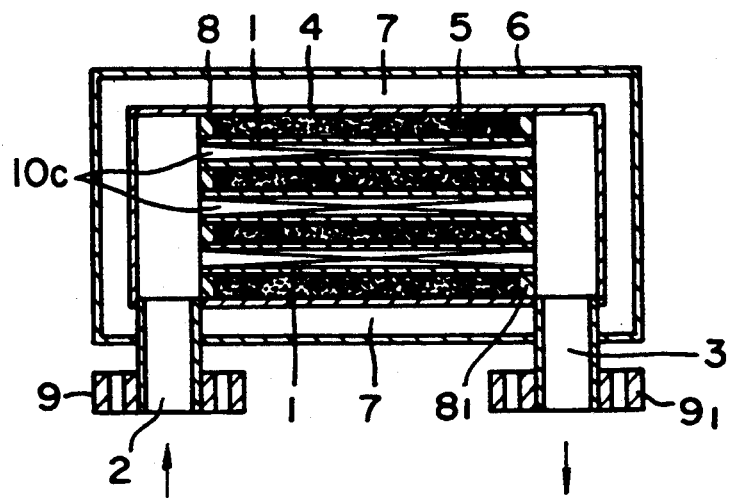
FIG. 4 is a view similar to FIG. 1, but showing still another embodiment of this invention.

A still different form of device embodying this invention is shown in FIG. 4. It is substantially equal to the device shown in FIG. 3, but has a gas inlet 2 and a gas outlet 3 which are positioned differently from those shown in FIG. 3. The gas inlet and outlet 2 and 3 have axes which are perpendicular to the axis of the outer casing 4, while their counterparts in the device of FIG. 3 are coaxial with the outer casing 4.

Figure 5:
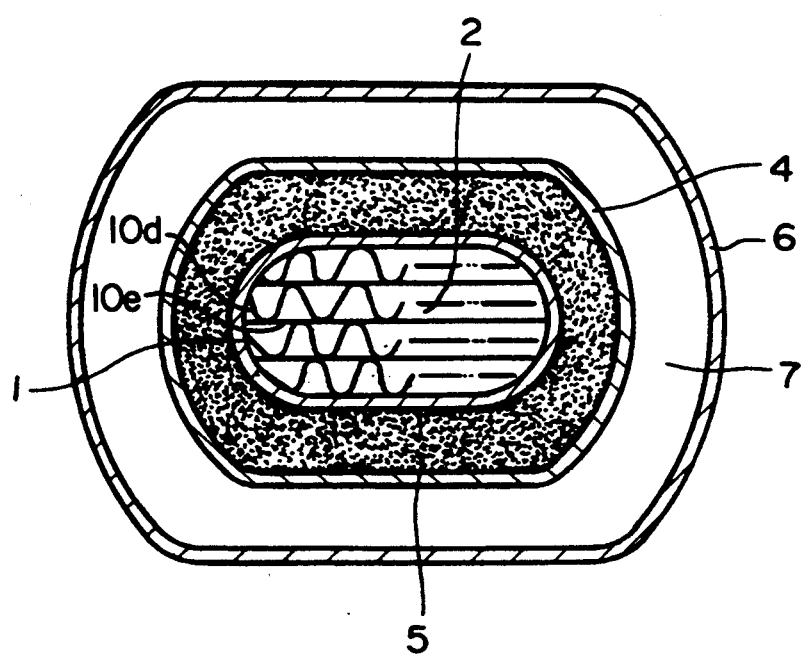
FIG. 5 is a view similar to FIG. 2a, but showing still another embodiment of this invention.

A still different form of a device embodying this invention is shown in FIG. 5. It is substantially equal to the device shown in FIG. 2a, but has a generally oval inner casing 1 having a laminating assembly of corrugated and flat sheets 10d and 10e, and has also generally oval casings 4 and 6 which are constructed differently from those shown in FIG. 2a.

No further description of FIGS. 3 to 5 is given, but reference is made to the foregoing description of FIGS. 1, 2a and 2b.

What is claimed is:

1. A device for catalytic purification of automotive exhaust gas from an engine, said device comprising:

at least one assembly of thin metal sheets configured with corrugations for defining a plurality of gas passages extending through said assembly, said sheets carrying a catalyst thereon;

at least one inner casing surrounding said assembly of sheets and defining a gas inlet and a gas outlet communicating with said gas passages defined by said assembly of sheets, said inlet being connectable to an exhaust pipe for receiving the automotive exhaust gas;

a heat storing material surrounding said inner casing;

an outer casing surrounding said heat storing material and said inner casing such that gas flow between said inner and outer casings is prevented; and a third casing surrounding and secured to said outer casing and in spaced relationship thereto for substantially preventing gas flow between said outer casing and said third casing, such that said third casing defines a heat insulating space around said outer casing, whereby the heat storing material stores heat of the automotive exhaust gas for holding the catalyst at a high temperature when the engine is turned off and enabling the catalyst to become effective more quickly when the engine is started again and whereby the heating insulating space defined by said third casing impedes heat dissipation from said heat storing material.

2. A device as set forth in claim 1, further including a plurality of sheets that are substantially flat, the flat sheets being disposed intermediate the sheets with corrugations therein and in contact with the corrugations of at least one said sheet adjacent thereto, such that the gas passages are defined between the corrugations and the flat sheet adjacent thereto.

3. A device as set forth in claim 1, wherein said heat-insulating space is an evacuated one.

4. A device as set forth in claim 3, wherein said sheets are of a steel containing 20% by weight of chromium and 5% by weight of aluminum, the balance of its composition being substantially iron.

5. A device as set forth in claim 1, wherein said assembly comprises spirally wound sheets.

6. A device as set forth in claim 1, wherein said assembly comprises a plurality of sheets laminated together.

* * * * *